United States Patent Office 3,464,806
Patented Sept. 2, 1969

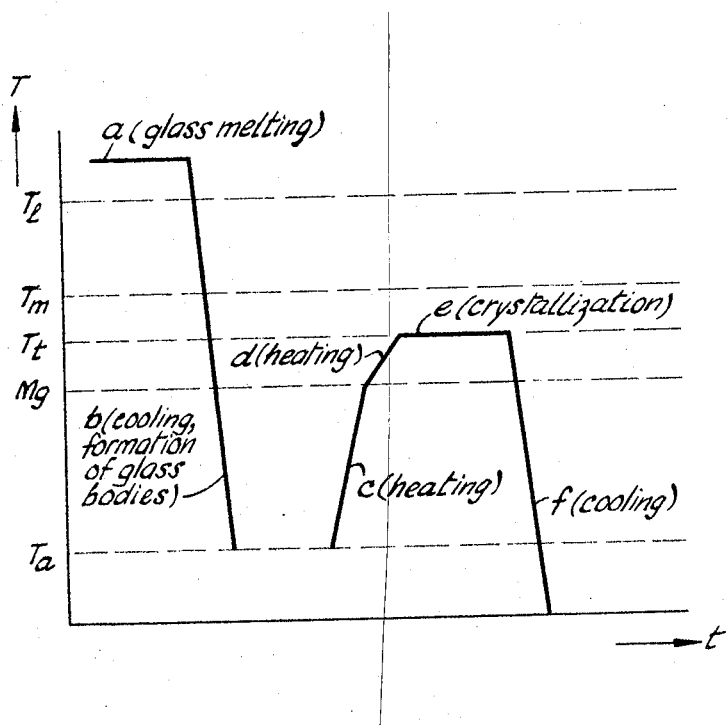

3,464,806
METHOD OF PRODUCING METALLIZED CERAMIC BODIES BY SURFACE COATING OF GLASS DURING DEVITRIFICATION HEAT TREATMENT
Shigeru Seki and Hiroshi Utsumi, Nagoya-shi, Aichi-ken, Japan, assignors to Ishizuka Garasu Kabushiki Kaisha, Aichi-ken, Japan
Continuation-in-part of application Ser. No. 346,124, Feb. 20, 1964. This application June 7, 1967, Ser. No. 644,294
Claims priority, application Japan, Feb. 27, 1963, 38/9,823
Int. Cl. C03c 21/00
U.S. Cl. 65—32  3 Claims

ABSTRACT OF THE DISCLOSURE

A basic glass composition including definite amounts of a nucleating agent and a metal oxide selected from the group of silver oxide, cuprous oxide and mixtures thereof, is formed into glass bodies of desired configuration by the use of a conventional vitrification process. The bodies are then devitrified by heating in a reducing atmosphere under closely controlled conditions of temperature increase to the final devitrification temperature, to cause freely migrating metal ions released by the oxide to diffuse to the surface of the bodies and to form thereat an adherent metallized coating of desired thickness by reduction of the surface ions by said atmosphere.

---

The present invention relates to a method of producing ceramic-like bodies or articles by devitrification of glass at controlled temperature conditions and below the glass melting or liquidus point, to cause crystallization of the glass and the formation of a ceramic-like product, referred to as devitroceramics in the following specification.

More particularly, the invention is concerned with a combined devitrification and metallizing process for the fabrication of metal-coated devitroceramic bodies or articles of any desired configuration, especially, though not limitatively, for use in the electrical and electronic industries.

While the formation of a metallic or other conductive coating upon the surface of a ceramic body, including ordinary ceramics as well as devitroceramics, by means of an evaporation, painting, baking or the like process, is widely used in the electrical and other arts, the known methods have not always been fully successful in producing both a strong and uniform, as well as a stable and closely bonded film or coating upon the ceramic surface, as required especially in connection with electrical or electronic applications and devices.

Applicants have discovered that metal oxide included in a glass body of suitable composition may be caused to release freely migrating metal ions capable of diffusing to the surface of the body during devitrification heat treatment under closely controlled temperature conditions, in such a manner as to produce a stable and closely adhering metallized surface coating or film by reduction by a surrounding reducing atmosphere, such as hydrogen or oxygen, provided the metal or compound is included in a properly controlled quantity in the original glass mixture or composition from which the glass bodies or articles are formed, to result in the release of an adequate amount of freely migrating metal ions capable of diffusing through the glass during devitrification, provided the maintenance of a close devitrification temperature control and treating time.

Accordingly, an important object of the present invention is the provision of a novel process of producing metal coated devitroceramic bodies or articles which is both simple in its use or operation and which will result in the production of a uniform and stable metal surface film or coating firmly bonded to the ceramic surface.

It has been found that the surface diffusion of the metal ions taking place during devitrification or crystallization heat treatment of the glass or the previously formed or molded vitrified bodies or articles is more or less independent of the type of metal used, while devitrification is dependent upon the temperature of the respective glass composition. Accordingly, the invention applies with equal advantage to the production of different types of devitroceramics requiring varying heat treatments, provided the melting point of the metal remains above the devitrification or treating temperature. While various metals have been tested, optimum and consistent results have been obtained with both cuprous and silver oxide, or mixtures of both, as coating materials. A further advantage of the latter metals is their high ion mobility, whereby to result in both an effective and stable coating within a minimum of treating time, on the one hand, as well as the prevention of interference with the crystallization or devitrification process of the glass composition, on the other hand.

Besides, it has been found that the metallic oxide included in the basic glass composition must remain within closely defined limits, that is, practically within 0.05 to 5 weight percent of the composition, to ensure a sufficiently coherent and stable film or coating, on the one hand, and to prevent interference of the migrating ions with the devitrification process per se, on the other hand. The thickness of the film or coating may be controlled by varying the weight percentage of the metal oxide, and/or the treating temperature and treating times within the limits given and as will appear further from the following.

The invention, both as to the foregoing and ancillary objects as well as novel aspects thereof, will be better understood from the following detailed description of a preferred and simplified method for carrying into effect the same, taken in conjunction with the accompanying drawing constituting a graph explanatory of the heat treating steps or temperature control according to the invention.

An initial glass mixture or composition, hereinafter referred to as composition A, from which are formed or molded the glass bodies or articles to be metallized, comprises as major components silicon oxide ($SiO_2$) of 40–75 weight percent, aluminum oxide ($Al_2O_3$) of 2–35 weight percent, lithium oxide ($Li_2O$) of 0.5–15 weight percent and magnesium oxide ($MgO$) of 0.1–15 weight percent of said composition. Added to the latter, in accordance with the present invention, is a crystallization-catalyzing or nucleating agent in the form of titanium oxide ($TiO_2$) or zirconium oxide ($ZrO_2$), or a mixture thereof, of 1–10 weight percent, and a reducible metal compound of 0.05–5 weight percent in the form of silver oxide ($Ag_2O$), cuprous oxide ($Cu_2O$), or a mixture of both. If desired, other well-known components may be added in the glass raw material in suitable quantities, such as a crystallization accelerator in the form of fluorine or the like.

The original starting composition or glass raw material is heat treated in a known manner by raising it to or above the glass melting point or liquidus temperature $T_1$ as shown at $a$ by the graph of the accompanying drawing, representing treating time as abscissa and temperature as ordinate. In the case of the composition aforedescribed, this temperature is within a range of 1350 C. to 1600 C. The molten glass mixture is shaped or molded into bodies or articles of desired configuration (plates, rods, tubes or the like) and allowed to cool in known manner to annealing or room temperature $T_a$, to form vitrified articles during the step b, substantially in accordance with conventional vitrification or glass manufacturing techniques.

Subsequently, the molded glass bodies or articles including the nucleating agent and reducible metal oxide are subjected to devitrification under closely controlled temperature conditions and below the glass liquidus point $T_1$ by at first, that is prior to reaching the Mg point of the composition (region of maximum expansion of the glass) and as indicated by step c in the graph, raising the temperature relatively rapidly, or practically at a rate not exceeding 10° C. per minute, and by subsequently, that is, during step d or after passing said point, increasing the temperature at a lesser rate, or practically not exceeding 5° C. per minute, until reaching the final devitrification or treating temperature $T_t$, the latter being about 750°–1050° and below the metal melting point $T_m$ of 960°–1050° in the example being described. The treating or devitrification temperature $T_t$ is maintained during a sufficient time as indicated at e, practically from one half to three hours, to ensure adequate crystallization, on the one hand, and to produce a metal coating or film of desired stability and thickness, on the other hand.

It is believed that the graduated heating of the bodies to final devitrification temperature, that is, first at a relatively high rate followed by a reduced rate, as described and shown by the graph, results in an initial copious release of metallic ions by ionization of the metal compound by virtue of the relatively high initial heating rate, whereupon the freely movable ions are allowed to readily diffuse through the material at a suitable speed or rate by virtue of the reduced rate of heating of the material towards the final devitrification temperature, to result in a uniform and closely bonded metal film or coating formed upon the surface of the bodies and having a thickness determined, among other factors, by the treating time e followed by cooling to ambient or room temperature during the period f as shown by the graph.

While glass composition A described in the foregoing has been found to produce highly satisfactory results in practice, involving the use of relatively short and economical treating times, further extensive tests have shown that variations of the basic glass composition or raw material may be made within limits without affecting the results in a qualitative way, that is, the production of a final metallic film or coating upon the devitrified glass products. As a matter of fact, it has been found that the invention may be used with greater or lesser result in conjunction with practically any devitrification process, provided the inclusion in the initial glass composition of a suitable nucleating agent or agents, to be determined by experiment, and of a metal oxide or oxides as described and in amounts within the limits given, on the one hand, and provided further a properly controlled devitrification heat treatment as described and shown, on the other hand.

As an example, according to a slightly modified glass composition, the MgO component of composition A may be omitted and other optical nucleating agents added, such as by selection of at least one of the group consisting of titanium oxide ($TiO_2$), zirconium oxide ($ZrO_2$), lead pentoxide ($Pb_2O_3$) and molybdenum oxide ($MoO_3$) in the relative amounts given in connection with composition A (1–10 weight percent). The metallic compound or compounds may be the same as in the case of composition A.

As a further illustration, there is described in the following an alternative example of a glass mixture, referred as composition B and differing from composition A described in the foregoing by the inclusion of additional ingredients in the basic glass mixture, said alternative composition comprising as major components silicon oxide ($SiO_2$) of 40–75 weight percent, aluminum oxide ($Al_2O_3$) of 10–35 weight percent, lithium oxide ($Li_2O$) of 0.5–8 weight percent, magnesium oxide (MgO) of 1–15 weight percent, calcium oxide (CaO) of 1–10 weight percent, sodium oxide ($Na_2O$) of 0–6 weight percent, and boric oxide ($B_2O_3$) of 0–8 weight percent, to which mixture may be added fluorine (F) as an accelerator of 0–7 weight percent. The nucleating agent advantageously consists of zirconium oxide ($ZrO_2$) of 1–6 weight percent, while the reducible metal compound is again selected from the group consisting of silver oxide ($Ag_2O$), cuprous oxide ($Cu_2O$) and mixtures thereof of 0.05–5 weight percent as in composition A. Devitrification is substantially the same as for composition A and as described in reference to the drawing.

The glass melting temperature of composition B is preferably between 1350° and 1450° C., while the devitrification or treating temperature is again between 1050°–750° C. as for composition A.

Both glass compositions A and B used in connection with the basic devitrification process according to the invention have been found to result in a closely bonded and highly stable metal film or coating on the surface of the final devitrified bodies or articles, said film having a thickness which can be controlled to relatively close tolerances in the manner described.

There is thus provided by the invention a simplified and highly efficient as well as economical method of producing devitroceramic bodies or articles, said method consisting essentially in a combined devitrification and coating or metallizing step applied to previously formed or molded glass bodies or articles of desired configuration produced substantially in accordance with conventional vitrification or glass manufacturing techniques. To carry into effect the invention, it is simply necessary to include in a suitable initial glass composition a nucleating agent adapted to promote or catalize crystallization of the glass bodies formed from said composition, as well as a reducible metal oxide or mixture of oxides in controlled and predetermined amounts, and to utilize a closely controlled devitrification heat treatment to release a sufficient amount of metal ions capable of migrating, within the material maintained at proper treating temperature, to the surface of the bodies to be reduced thereat to pure metal by a surrounding reducing atmosphere, the thickness of the resultant surface film being easily and effectively controllable by varying the treating time and other factors described.

We claim:
1. A method of producing metal coated ceramic-like bodies by devitrification heat treatment of a basic glass mixture, said glass mixture including
  (1) a glass composition selected from the group consisting of compositions A and B, wherein composition A comprises silicon oxide of 40–75 weight percent, aluminum oxide of 2–35 weight percent, lithium oxide of 0.5–15 weight precent and magnesium oxide of 0.1–15 weight percent, and composition B comprises silicon oxide of 40–75 weight percent, aluminum oxide of 10–35 weight percent, lithium oxide of 0.5–8 weight precent, magnesium oxide of 1–15 weight percent, calcium oxide of 0–10 weight percent, sodium oxide of 0–6 weight percent, fluorine of 1–7 weight percent, and boric oxide of 0–8 weight percent,
  (2) a nucleating agent for said compositions A and B consisting, respectively, of an oxide of 1–10 weight percent selected from the group of titanium oxide and zirconium oxide, and 1–6 weight percent of zirconium oxide, and
  (3) a reducible metal oxide of 0.05–5 weight percent selected from the group of silver oxide, cuprous oxide and mixtures thereof, said oxide capable of producing freely migrating metal ions within said compositions during devitrification heat treatment,
said method including the steps of
  (a) heating said mixture to a melting point within the range, respectively, of 1350° C.–1600° C. and 1350° C.–1450° C. for said compositions A and B, and molding the same into vitrified bodies of desired configuration, (b) raising the molded glass bodies in a reducing atmosphere to a devitrification treating temperature of between 750° C. and 1050° C. at a rate not exceeding 10° per minute prior to reaching of the Mg point of the glass and not exceeding 5° C. per minute after passing said point, to simultaneously effect crystallization of the bodies and to ionize said oxide and to cause the freely migrating metal ions to diffuse to the surface of the bodies, (c) maintaining said treating temperature during a period of from one half to three hours, and (d) cooling said bodies, to produce a coherent metallized coating upon the surface of the devitrified bodies by reduction of the diffused surface ions by said atmosphere.

2. A method of producing metal coated ceramic bodies as claimed in claim 1, said reducing atmosphere consisting of hydrogen.

3. A method of producing metal coated ceramic-like bodies by devitrification heat treatment of a basic glass composition including as major components silicon oxide ($SiO_2$) of 40–75 weight percent, aluminum oxide ($Al_2O_3$) of 2–35 weight percent, and lithium oxide ($LiO_2$) of 0.5–15 weight percent, a nucleating agent of 1–10 weight percent selected from the group of titanium oxide ($TiO_2$), zirconium oxide ($ZrO_2$), lead pentoxide ($Pb_2O_5$) and molybdenum oxide ($MoO_3$), and a metal oxide of 0.05–5 weight percent selected from the group consisting of silver oxide ($Ag_2O$), cuprous oxide ($Cu_2O$) and mixture thereof, said method including the steps of (1) raising said composition to melting temperature and cooling and molding the same into vitrified bodies of desired configuration, (2) raising the molded glass bodies in a reducing atmosphere below the glass melting point and at a rate not exceeding 10° C. per minute prior to reaching of the Mg point of the glass and not exceeding 5° C. per minute after passing said point, to simultaneously effect crystallization of said bodies and to ionize said metal oxide, to produce freely migrating metal ions diffusing to the surface of the bodies, (3) maintaining said treating temperature during a period of from one half to three hours, and (4) cooling said bodies, to produce a coherent metallized coating upon the surface of the bodies by reduction of the diffused surface ions by said atmosphere.

References Cited

UNITED STATES PATENTS

| | | | |
|---|---|---|---|
| 3,282,711 | 11/1966 | Lin | 65—33 XR |
| 3,146,114 | 8/1964 | Kivlighn | 65—33 |
| 3,117,881 | 1/1964 | Henry et al. | 65—33 XR |
| 3,231,456 | 1/1966 | McMillan et al. | 65—33 XR |
| 3,275,492 | 9/1966 | Herbert | 65—33 XR |
| 3,170,780 | 2/1965 | Takehara et al. | 65—33 XR |

FOREIGN PATENTS 944,571   12/1963   Great Britian.

S. LEON BASHORE, Primary Examiner

FRANK W. MIGA, Assistant Examiner

U.S. Cl. X.R.

65—30, 33, 60, 134; 106—39, 52, 54